United States Patent
Reed et al.

(10) Patent No.: US 7,848,604 B2
(45) Date of Patent: Dec. 7, 2010

(54) FIBER-OPTIC CABLE AND METHOD OF MANUFACTURE

(75) Inventors: Donald Reed, St. Augustine, FL (US); Greg Condrey, Palm Coast, FL (US); Mark Messer, St. Johns, FL (US)

(73) Assignee: Tensolite, LLC, Saint Augustine, FL (US)

( * ) Notice: Subject to any disclaimer, the term of this patent is extended or adjusted under 35 U.S.C. 154(b) by 0 days.

(21) Appl. No.: 11/848,500

(22) Filed: Aug. 31, 2007

(65) Prior Publication Data

US 2009/0060430 A1    Mar. 5, 2009

(51) Int. Cl.
*G02B 6/44*    (2006.01)
(52) U.S. Cl. .................. 385/100; 385/103; 385/106
(58) Field of Classification Search ............... 385/100
See application file for complete search history.

(56) References Cited

U.S. PATENT DOCUMENTS

| | | | |
|---|---|---|---|
| 4,143,942 A | 3/1979 | Anderson | |
| 4,147,406 A | 4/1979 | Anderson | |
| 4,374,608 A | 2/1983 | Anderson | |
| 4,441,787 A | 4/1984 | Lichtenberger | |
| 4,510,348 A | 4/1985 | Arroyo et al. | |
| 4,515,435 A | 5/1985 | Anderson | |
| 4,756,600 A * | 7/1988 | Ramsay et al. | 385/106 |
| 4,896,940 A | 1/1990 | Kathiresan et al. | |
| 5,002,359 A | 3/1991 | Sayegh | |
| 5,074,640 A | 12/1991 | Hardin et al. | |
| 5,138,684 A | 8/1992 | Bullock et al. | |
| 5,171,635 A | 12/1992 | Randa | |
| 5,189,721 A | 2/1993 | Sayegh et al. | |
| 5,201,020 A | 4/1993 | Kannabiran | |
| 5,208,889 A | 5/1993 | Cedrone et al. | |
| 5,214,243 A | 5/1993 | Johnson | |
| 5,220,133 A | 6/1993 | Sutherland et al. | |
| 5,253,318 A * | 10/1993 | Sayegh et al. | 385/114 |
| 5,293,442 A * | 3/1994 | Sayegh | 385/102 |
| 5,355,427 A | 10/1994 | Gareis et al. | |
| 5,408,564 A | 4/1995 | Mills | |
| 5,412,749 A | 5/1995 | Sayegh et al. | |
| 5,436,994 A | 7/1995 | Ott et al. | |
| 5,504,830 A | 4/1996 | Ngo et al. | |
| 5,539,849 A * | 7/1996 | Petisce | 385/107 |
| 5,539,851 A | 7/1996 | Taylor et al. | |

(Continued)

FOREIGN PATENT DOCUMENTS

EP    0072594    2/1983

(Continued)

OTHER PUBLICATIONS

Three-page International Search Report for PCT/US2008/062383.

*Primary Examiner*—Uyen-Chau N Le
*Assistant Examiner*—Kajli Prince
(74) *Attorney, Agent, or Firm*—Wood, Herron & Evans, LLP (57) ABSTRACT

A fiber-optic cable with low buffer insertion force, significant kink resistance, and improved thermal performance incorporating a dual layer buffer of a low density material beneath a continuous seamless high modulus material without compromising low smoke, toxicity, and flammability.

26 Claims, 6 Drawing Sheets

U.S. PATENT DOCUMENTS

| | | | |
|---|---|---|---|
| 5,557,698 A | 9/1996 | Gareis et al. | |
| 5,566,266 A | 10/1996 | Nave et al. | |
| 5,615,293 A | 3/1997 | Sayegh | |
| 5,675,686 A | 10/1997 | Rosenmayer et al. | |
| 5,706,382 A | 1/1998 | Smith | |
| 5,731,088 A | 3/1998 | La Court | |
| 5,764,835 A | 6/1998 | Rubin et al. | |
| 5,811,490 A | 9/1998 | Jozokos et al. | |
| RE36,146 E * | 3/1999 | Novack et al. | 385/128 |
| 5,878,179 A * | 3/1999 | Schricker | 385/100 |
| 5,920,671 A | 7/1999 | Smith | |
| 5,972,441 A | 10/1999 | Campbell et al. | |
| 6,025,044 A | 2/2000 | Campbell et al. | |
| 6,027,779 A | 2/2000 | Campbell et al. | |
| 6,063,496 A | 5/2000 | Jozokos et al. | |
| 6,074,100 A | 6/2000 | Rowland et al. | |
| 6,102,581 A | 8/2000 | Deveau et al. | |
| 6,151,433 A | 11/2000 | Dower et al. | |
| 6,233,284 B1 | 5/2001 | Townshend | |
| 6,233,384 B1 | 5/2001 | Sowell, III et al. | |
| 6,287,692 B1 | 9/2001 | Luo et al. | |
| 6,326,416 B1 | 12/2001 | Chien et al. | |
| 6,352,372 B1 | 3/2002 | Shahid | |
| 6,352,531 B1 * | 3/2002 | O'Connor et al. | 606/15 |
| 6,361,299 B1 | 3/2002 | Quigley et al. | |
| 6,362,249 B2 | 3/2002 | Chawla | |
| 6,365,072 B1 | 4/2002 | Katoot et al. | |
| 6,429,263 B2 | 8/2002 | Hwang et al. | |
| 6,439,777 B1 | 8/2002 | Harrison et al. | |
| 6,453,097 B1 | 9/2002 | Newton et al. | |
| 6,492,453 B1 | 12/2002 | Ebrahimian et al. | |
| 6,527,458 B2 | 3/2003 | Kim | |
| 6,569,794 B1 | 5/2003 | Reid et al. | |
| 6,576,166 B1 | 6/2003 | Perrin et al. | |
| 6,582,116 B2 | 6/2003 | Nielsen | |
| 6,623,172 B1 | 9/2003 | de Jong et al. | |
| 6,638,617 B2 | 10/2003 | Kim et al. | |
| 6,648,520 B2 | 11/2003 | McDonald et al. | |
| 6,652,155 B2 | 11/2003 | Lampert | |
| 6,658,187 B2 | 12/2003 | Militaru | |
| 6,673,866 B2 | 1/2004 | Zolotnitsky | |
| 6,674,946 B2 | 1/2004 | Warden et al. | |
| 6,754,423 B2 | 6/2004 | Simons et al. | |
| 6,781,063 B2 | 8/2004 | Kim et al. | |
| 6,859,593 B2 | 2/2005 | Fournier et al. | |
| 6,882,788 B2 | 4/2005 | Van Bergen et al. | |
| 6,898,354 B2 | 5/2005 | Kim et al. | |
| 7,006,751 B2 | 2/2006 | Provost et al. | |
| 7,049,522 B2 | 5/2006 | Kim et al. | |
| 7,049,523 B2 | 5/2006 | Shuman et al. | |
| 7,068,895 B2 | 6/2006 | Kuijpers et al. | |
| 7,068,899 B2 | 6/2006 | Milicevic et al. | |
| 7,116,877 B2 | 10/2006 | Kuijpers et al. | |
| 7,187,829 B2 | 3/2007 | Anderson et al. | |
| 7,190,867 B2 | 3/2007 | Johnson et al. | |
| 7,194,168 B2 | 3/2007 | Rosenquist | |
| 7,197,216 B2 | 3/2007 | Storaasli et al. | |
| 7,203,405 B1 | 4/2007 | Storaasli | |
| 7,203,408 B2 | 4/2007 | Matthijsse et al. | |
| 7,212,715 B2 | 5/2007 | Dallas et al. | |
| 7,221,831 B2 | 5/2007 | Keller et al. | |
| 7,226,215 B2 | 6/2007 | Bareel et al. | |
| 7,229,674 B2 | 6/2007 | Overton et al. | |
| 7,242,830 B2 | 7/2007 | Storaasli et al. | |
| 2004/0240804 A1 * | 12/2004 | Mahapatra et al. | 385/94 |

FOREIGN PATENT DOCUMENTS

| | | |
|---|---|---|
| EP | 0527266 | 2/1993 |
| EP | 1076253 | 2/2001 |
| EP | 1094347 | 4/2001 |
| FR | 2693806 | 1/1994 |
| GB | 2214653 | 1/1998 |
| JP | 59053802 | 3/1984 |
| JP | 0741629 | 2/1995 |
| WO | WO9805493 | 2/1998 |
| WO | WO2005078498 | 8/2005 |

* cited by examiner

FIBER-OPTIC CABLE AND METHOD OF MANUFACTURE

FIELD OF THE INVENTION

The present invention relates generally to fiber-optic cables, and more specifically, to a fiber-optic cable having improved physical and performance characteristics.

BACKGROUND OF THE INVENTION

Fiber-optic cables are used in a wide variety of applications today to replace traditional copper cables. Such fiber-optic cables, for example, may be utilized to transmit data and control signals between computers and processors. Optical fiber provides reliable data transfer, with exceptional speed and bandwidth. The small size and the light weight of fiber-optic cables make them particularly useful in communication applications, which have significant space and weight restrictions. Fiber-optic cables receive significant use in the aerospace industry for both commercial and military applications. In such usage, the fiber-optic cables must have a very robust construction because even minor failures in a cable may have significant undesirable consequences. Generally, the construction of a fiber-optic cable includes a glass strand, or fiber, that is surrounded by one or more outer layers, or jackets. For example, a fiber-optic device may include a glass strand having a suitable cladding for transmitting the optical signals. A coating is applied over the glass strand. A buffer layer is utilized on the outside of the glass strand for physically supporting and buffering the fragile glass strand. Furthermore, since fiber-optic cables are often subjected to extremes in temperature, pressure, vibration and shock, additional layers, such as strength layers, are utilized on the outside of the buffer. Finally, an insulated jacket layer surrounds the entire fiber-optic cable assembly to provide a protective outer surface. Additionally, each of the buffer layers, strength member and jacket layer serves to provide a robust structure in which the attachment of the cable to a terminus and connector can be made.

One particular parameter that is addressed in manufacturing and utilizing fiber-optic cables is the engagement force, that is necessary to mate the terminal ends of two fiber-optic cables, such as in a connector assembly. This force is also sometimes referred to as the "mating force" of a connector, however, the more standard terminology is "engagement force". The engagement force associated with a fiber-optic cable is of particular interest, as new applications demand an increase in the density of cables that are terminated in a connector. The engagement forces of all the cables in a connector are cumulative, and thus they increase linearly with an increase in the cable density of the connector.

Generally, one or more fiber-optic cables are terminated in a suitable connector, or termini, that is then plugged into or mated with another, appropriate cable connector. To insure a proper interface at the ends of the mated fiber-optic cables, the connectors include spring-loaded contact elements. The spring-loaded elements of the connector in which the fiber-optic cables terminate, must be depressed, or translated, within the connector housing when the connector is mated with another connector. As such, a certain amount of force is required to translate the multiple spring-loaded connector elements of multiple cables terminated in the connector. Such a force contributes to the "engagement force" of the connectors. As may be appreciated, the greater the density of cables at a connector, the greater the engagement force for that connector.

Because of the construction of the connectors and the process of terminating fiber-optic cables therein, portions of the fiber-optic cable, namely the glass fiber and buffer, must telescope, or longitudinally slide, inside one or more of the other cable layers. Specifically, the glass fiber and buffer are terminated at the spring-loaded contact element, while the outer layers of the fiber-optic cable are held stationary with respect to the connector. When the connector is mated with another connector, the spring-loaded contact element moves in the connector body, or housing. As such, when the spring-loaded contact element and the fiber therein, move within the connector housing, the glass fiber and buffer layers generally will move slightly, or telescope, with respect to the strength layers and jacket layers, and any other layers that are terminated at the end of the connector housing. Consequently, there is an additional force required during connector mating that is also necessary to move the glass fiber and buffer, with respect to the other layers of the fiber-optic cable. This force, often referred to as a "buffer insertion force" or "buffer push-in force", adds to the force that is necessary to move the spring-loaded contact element within the connector housing. For consistency, the terminology "buffer insertion force" will be used throughout the remainder of this document.

While the buffer insertion force for a single fiber-optic cable, or even several cables, may not be a particular issue in connecting the terminal ends of the cables, a desire for greater connector density, particularly in the aerospace industries, has generated a need to reduce the high engagement force that may result from such high density connectors. That is, the cumulative buffer insertion force that increases in a multiplicative fashion as the number and density of fibers in a particular connector increases, may create an engagement force so large that it is difficult for an installer, without additional machines or tools, to connect two opposing connectors. As such, it is desirable to reduce the high engagement forces that result from high-density fiber-optic connectors.

Fiber-optic cables are available that provide desirable performance and durability characteristics, particularly for the aerospace industries. For example, the assignee of the present invention, Tensolite Company, of Saint Augustine, Fla., provides a fiber-optic cable manufactured to Boeing Commercial Aircraft Company's specification, BMS 13-71, which meets the vigorous standards of the aerospace industry. The Tensolite manufactured BMS 13-71 cable uses a glass fiber that includes a fiber-optic core, cladding, and a conventional coating material. It utilizes multiple buffer layers, which include a first buffer layer that is an extruded expanded PTFE (ePTFE). A second buffer layer is formed of two opposing helical wraps of adhesive coated 0.001" polyimide tapes that are wrapped, and then fused together with heat. On the outside of the buffer layer, an overlap skived 0.001" thick PTFE tape is loosely wound in a helical wrap. Then, a strength member, such as a braided layer, made of a woven aramid fiber and glass fiber, is positioned over the buffer layers, and PTFE tape. An outer jacket layer made of an extruded fluoropolymer, such as FEP, provides the outer layer of a fiber-optic cable.

Another issue that must be addressed with fiber-optic cables is the kink resistance of the cable. Fiber-optic cables, similar to other cables, are bent and curved and otherwise manipulated when installed. As a result, severe bending or manipulating the cable around a small radius may result in a kink in the cable, thus reducing the light transmission to the point of rendering the cable inoperable. As such, the kink resistance of a cable is an important parameter in determining whether the fiber-optic cable is suitable for a particular application.

It is therefore desirable to improve generally upon existing fiber-optic cable technology and to provide a fiber-optic cable with a significantly-reduced buffer insertion force that makes the cable useful for high-density fiber-optic connectors and applications. It is also desirable to reduce the engagement force necessary for mating high density connectors, while maintaining and improving the overall performance and durability of the fiber-optic cables. It is further desirable to increase the kink resistance of a cable. The present invention addresses these issues and other issues, as set forth in more detail below.

These features and other features of the invention will be come more readily apparent from the Detailed Description and drawings of the application.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

SUMMARY OF THE INVENTION

A fiber-optic cable includes an optical fiber with a buffer positioned around the optical fiber. The buffer includes at least a first buffer layer and a second buffer layer overlaying the first buffer layer. The first buffer layer in one embodiment is a low density material, such as an expanded PTFE layer, that forms a semi-loose buffer. The second buffer layer is continuous material layer formed over the first buffer layer using a continuous application process, such as a coating or extrusion process. In one embodiment, the second buffer layer is a homogenous continuous layer of a material having a flexural modulus in the range of 1.0 to 10.0 GPa. For example a coating or extruded layer of a polyimide material might be used. A slip layer is positioned around the buffer. The slip layer is formed of a low surface-friction film. For example, a skived PTFE tape layer having a longitudinal wrap and overlap is used and eliminates seams and ridges along the length of the cable. A strength member layer is positioned around the slip layer and an outer jacket is positioned around the strength member. The fiber-optic cable has a low buffer insertion force, significant kink resistance, and improved thermal performance incorporating a dual layer buffer of a low density material beneath a continuous seamless high modulus material without compromising low smoke, toxicity, and flammability. Further embodiments and other details regarding the invention are set forth below.

DETAILED DESCRIPTION OF EMBODIMENTS OF THE INVENTION

The fiber-optic cable constructed in accordance with the aspects of the present invention significantly reduces the buffer insertion force associated with the cable, thus allowing for a high number and density of cables to be utilized within high density fiber-optic connectors and associated applications. Furthermore, the inventive fiber-optic cable eliminates tape wrap de-lamination associated with cables utilizing thin-wrapped tapes to form the cable buffer. Still further, the inventive cable provides a desirable reduction in diameter and weight. Such design parameters are particularly important in aerospace applications where size is limited and weight is a critical factor. In addition to meeting the design goals noted above, the present invention also provides improved bend/kink performance, so that the cable may be more vigorously implemented in tighter spaces. Additionally, handling and installation is improved due to the ease of stripping the buffer in the inventive cable. All of these various benefits are achieved as noted, without a degradation of the optical, mechanical or thermal performance of the cable. Accordingly, the present invention presents significant improvements to the state of the art of fiber-optic cables.

Figure 1:
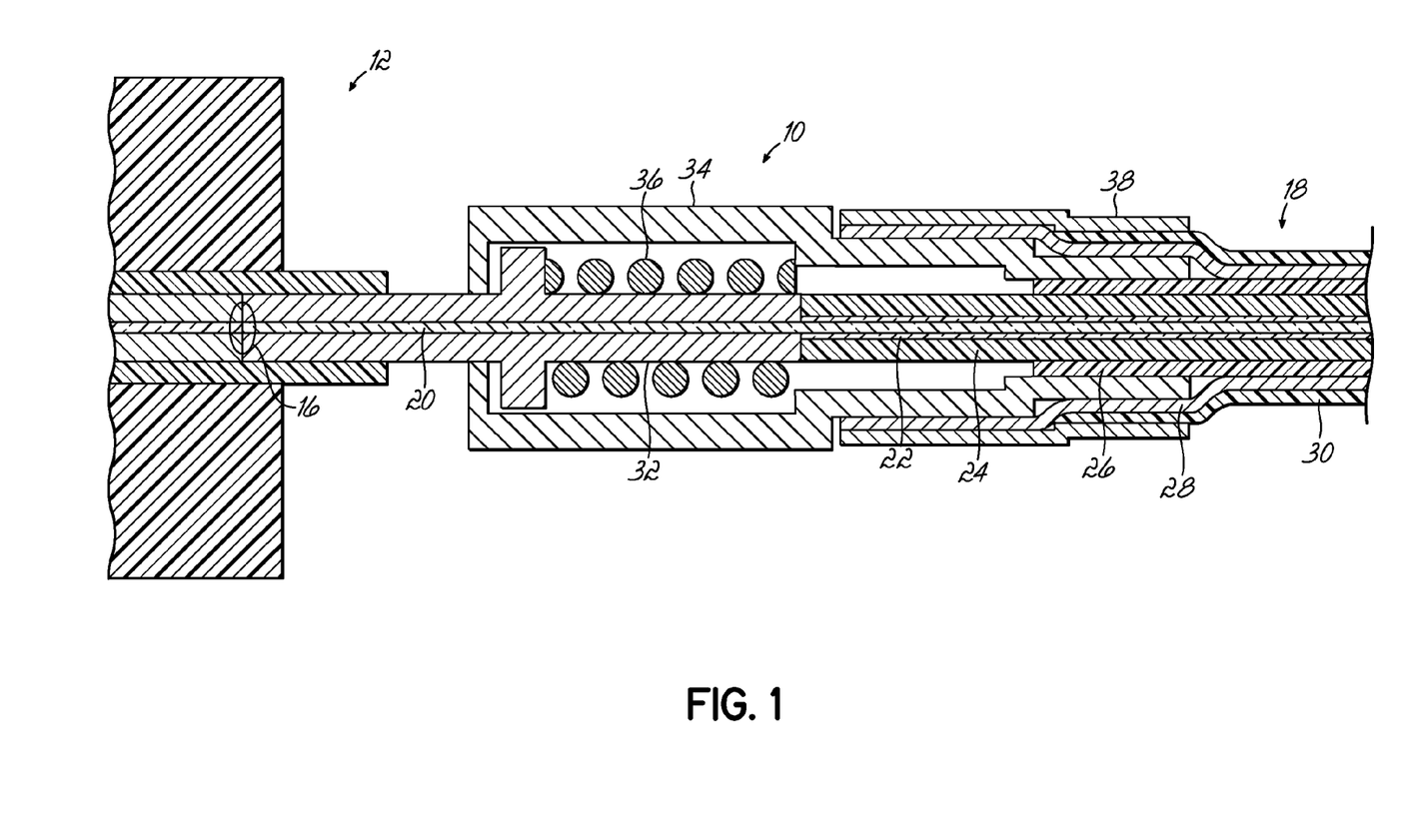
FIG. 1 is a cross-sectional view of a fiber-optic cable terminated in a connector.

For the purposes of illustrating benefits of the present invention and improvements in the buffer insertion force, it is helpful to understand the termination of a fiber-optic cable in a conventional connector. Referring to FIG. 1, a cable similar to the Tensolite BMS-13-71 cable is shown terminated in a connector. Specifically, a connector, or termini 10, is shown mated with an opposing connector 12, and held engaged with connector 12. The ends of the glass fibers are shown mated at area 16, when the connectors 10 and 12 are mated.

Fiber-optic cable 18 includes a center glass fiber 20, which includes a glass core, a cladding surrounding the core, and a coating, such as a high-temperature acrylate coating. An inner buffer layer 22 surrounds the coated fiber 20, and an outer layer buffer 24 surrounds the inner buffer layer 22. The skived PTFE tape layer, noted above, is shown by reference numeral 26. A strength layer 28 surrounds the buffer layers, followed by jacket layer 30.

To terminate cable 18, the glass fiber 20 is stripped of the buffer layers, and is directed into a contact member 32 of the connector 10. Contact member 32, which may be a ceramic member, moves within a housing element 34, and is biased, such as by spring 36, to extend toward the front of connector 10. The contact member 32 is able to telescope, under force, within the connector housing element 34. It is the spring-loaded contact member 32 that contributes to the engagement force of the cable. In terminating cable 18, the buffer layers 22, 24, and other outside layers 26, 28, and 30 are stripped from the optical fiber 20 so that it may be inserted into the contact element 32. The buffer layers 22, 24 are then terminated at the end of the contact element 32, and secured to the contact element, such as with an adhesive. Layers 26, 28, and 30 are then terminated at the end of the housing element 34 as shown. Using a spreader tool, the layers 28 and 30 are spread from the buffer and a portion of the housing element is inserted between the buffer and the layers 28, 30. The strength member 28 extends forwardly of the outer jacket and is trapped between an outer ferrule 38 and connector housing element 34. Ferrule 38, which may be crimped or otherwise secured to the housing element 34, anchors the cable 18 with the connector 10.

As may be seen in FIG. 1, to move the contact element 32 so that connector 10 may be mated with connector 12, the force of spring 36 must be overcome. Furthermore, an additional force is necessary to move fiber 20 and buffer layers 22, 24, with respect to the outer layers 28, 30 of the cable, when the contact element is depressed. Such a force is referred to the buffer insertion force, as noted above. As may be appreciated, each cable contributes its own buffer insertion force component to the overall connector. For a high density of cables, the cumulative buffer insertion force can be quite substantial. The present invention addresses this issue by significantly reducing the buffer insertion force of the fiber-optic cable.

Figure 2:
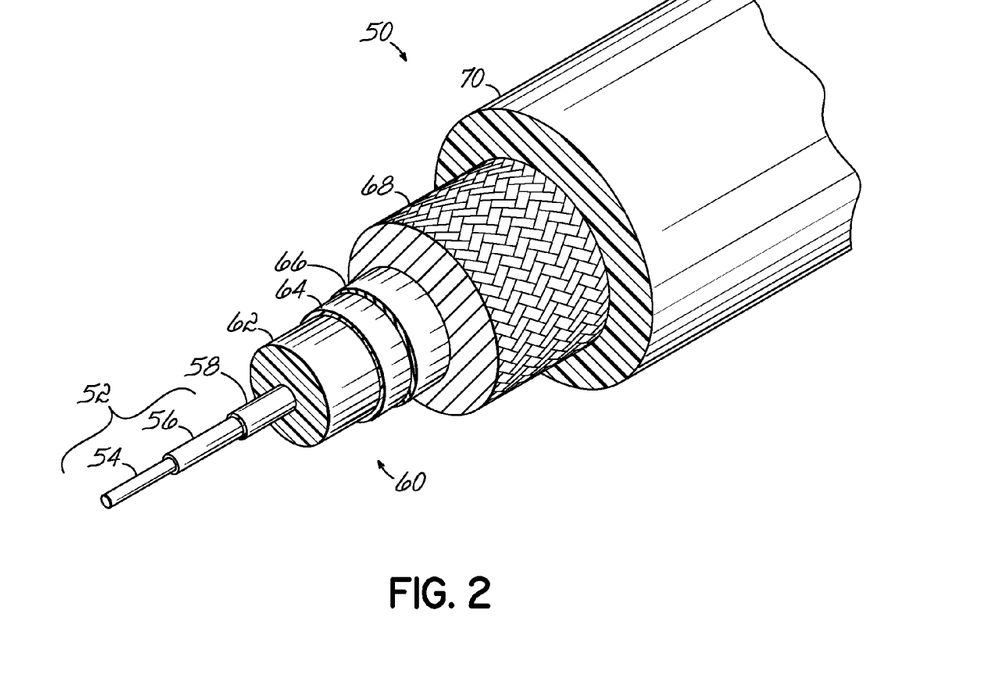
FIG. 2 is a perspective cross-sectional view of a fiber-optic cable in accordance with one embodiment of the invention.
Figure 3:
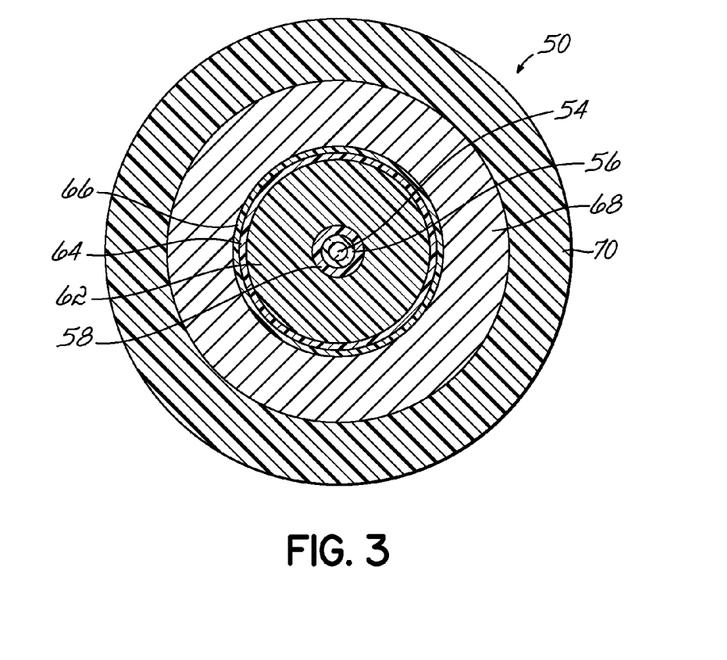
FIG. 3 is a cross-sectional view along lines 3-3 of FIG. 2.

Turning now to FIG. 2, an embodiment of the invention is illustrated. Specifically, cable 50 is a fiber-optic cable that incorporates a glass fiber and a series of outer layers surrounding the glass fiber. The layers have a position and composition within the overall cable design that not only significantly reduces the buffer insertion force, but also improves various mechanical and optical performance characteristics. Each respective layer circumferentially surrounds the glass fiber, and one or more of the inner layers. The glass fiber is generally coaxially located within cable 50. FIGS. 2 and 3 illustrate relative locations of various layers or layer elements as discussed herein. However, the layer thicknesses, as illustrated, are not precise, and are merely for illustrative purposes in showing the location of the various layer elements in relation to the construction of the entire cable.

Cable 50 includes a glass fiber element 52. The fiber element 52 includes a core 54 of a light transmitting material, such as glass, plastic, polymer or plastic-clad material, and a suitable cladding 56, as is known in fiber-optic technology. The glass fiber 52 may be a single mode or multi-mode optical fiber, may be a graded-index or step-index, and may have standard or non-standard dimensions, as will be understood by a person of ordinary skill in the art of fiber-optics. For example, multi-mode optical fibers with cores of 50.0 µm and 62.5 µm may be utilized. Alternatively, a single mode fiber with mode field or core diameters that range from 1.0 µm to 9.5 µm may be suitable for implementing an embodiment of the present invention. Of course, other diameter fibers, having core diameters of 100 µm, or over 200 µm might be used. The cladding will generally have a thickness in the range of 30 µm to 70 µm, for example, taking a 62.5 µm diameter fiber out to a 125 µm outer diameter (O.D.). Suitable core/cladding fibers might have O.D.'s of 125 µm, 172 µm, or 240 µm, for example. Various different cladded fibers are available commercially, as noted below.

Generally, an outer coating, or primary buffer layer 58, is positioned to surround the glass fiber 52. Generally, the coating is a high temperature material, such a high temperature acrylate. For example, a 100° C. acrylate available from Corning of Corning, N.Y., might be suitable. Other possible coatings include 125° C. Silicone coating from Corning, or a 150° C. acrylate coating material available from Fiberlogix of Warren, N.J.; Verillon of North Grafton, Mass.; J-Fiber of Juna, Germany; and Nufern of East Granby, Conn. might be utilized. A 200° C. acrylate coating from Fiberlogix might also be utilized. In addition to acrylates and other materials as noted above, a polyimide coating, such as a 200° C. polyimide coating might be utilized, and is available from OFS of Norcross, Ga.; Polymicro Technologies of Phoenix, Ariz.; Nufern; and Verillon. Additionally, some >200° C. ceramic coatings or hybrid glass might also be suitable for implementing the coating layer 66 of the present invention. The coating might have a thickness of around 120 µm, for example. Various coated fibers are commercially available, as noted below, and the invention is not limited to a particular fiber or coated fiber. Some suitable fibers for the invention include:

| Fiber Types | Primary Buffer Coatings Used | Vendors |
| --- | --- | --- |
| Multimode | Acrylate-CPC7 | Corning, Hickory, NC |
| SingleMode | Acrylate-CPC7 | Corning, Hickory, NC |
| Multimode | Polyimide | OFS, Norcross, GA; Verillon, North Grafton, MA; Nufern, East Granby, CT; Fiberlogix, Warren, NJ |
| SingleMode | Polyimide | OFS, Norcross, GA; Verillon, North Grafton, MA; Nufern, East Granby, CT; Fiberlogix, Warren, NJ |
| Multimode | High Temperature Acrylate-HTA | Fiberlogix, Warren, NJ; Verillon, North Grafton, MA; J-Fiber, Juna, Germany; Nufern, East Granby, CT |
| SingleMode | High Temperature Acrylate-HTA | Fiberlogix, Warren, NJ; Verillon, North Grafton, MA; J-Fiber, Juna, Germany; Nufern, East Granby, CT |
| Step Index | Polyimide | Nufern, East Granby, CT; Verillon, North Grafton, MA; Polymicro Technology, Phoenix, AZ |

Conventionally, existing fiber-optic cables have utilized a buffering system that might be considered either a tight buffer, or a loose buffer. With a tight buffer, a thermoplastic layer is coated, or extruded, onto the glass fiber, and the glass fiber is held tight within the buffer layer. In a loose buffer layer, a tube of a buffer layer material is formed, or extruded, and then the glass is directed into the tube, remaining loose within the buffer. The present invention, alternatively utilizes a buffer system that might be considered a semi-loose buffer. That is, it is not a traditional tight buffer or loose buffer.

In one embodiment of the invention, a first buffering layer 62 is formed utilizing a porous material that has a low density and is softer than a thermoplastic extrusion. In one particular embodiment, an expanded/foam PTFE (ePTFE) is utilized as a layer of the buffer. More specifically, a multiple layer buffer 60 is utilized, including a first buffer layer 62, and a second buffer layer 64. The first buffer layer is formed of an extruded ePTFE that is extruded onto the glass. The ePTFE forms a semi-loose porous layer on the glass fiber. The ePTFE layer 62 might be extruded onto the fiber 52 and coating 58, utilizing the apparatus and methodologies set forth in U.S. Pat. Nos. 4,529,564 and 4,826,725. Both of those issued U.S. Patents are incorporated herein by reference in their entireties.

For such an extrusion, conventional ram/paste extruders may be utilized with an associated wire transport system and a sintering apparatus. Several varieties of Isopar lubricants can be used in place of NAPTHA, thus requiring a corresponding range of devolatilization temperatures. Isopar is the brand name for eight grades of high purity isoparaffinic solvents with narrow boiling point ranges available from ExxonMobile Lubricants & Petroleum Specialties of Fairfax, Va. Although any Isopar grade can be used as a lubricant in the extrusion process, the selection of a preferred grade of Isopar is dependent upon the PTFE resin grade, extrusion pressures and desired finished size of the extrudate as referenced in the above patents. Isopar G or H are typically the preferred grades for extrusion Layer 62. Layer 62 may be prepared using ePTFE pastes containing low-density modifiers, such as glass beads or expanding polymeric beads. Other low-density materials might also be utilized to form the layer 62.

The PTFE resins utilized may typically be high molecular weight resins, as noted in the patents set forth above. However, the present invention is not restricted to such resins. Suitable PTFE resins are available, for example, from DuPont, Solvay Solexis SpA of Bollate, Milan, Italy, Asahi Glass Company America, Inc. of Charlotte, N.C., and Daikin America, Inc. of Orangeburg, N.Y. In one preferred embodiment, a PTFE resin from Daikin America, Inc. might be utilized, with heat processing settings around 500-515° F.

While PTFE resins are used in one embodiment of the invention, other embodiments might utilize layers made of FEP, ETFE, PVDF, and PEEK. In extruding such PTFE resins, the density levels may be from 0.3 g/cc to 1.9 g/cc. More preferably, the density level is between 0.7 g/cc and 1.5 g/cc, and still more preferably between 0.9 g/cc and 1.3 g/cc. With sintering of the extruded layer, the sinter level may be from 18 J/gm to 60 J/gm. Preferably, the sinter level is in the range of 22 J/gm to 55 J/gm, and still more preferably in the range of 35 J/gm to 45 J/gm. The ePTFE layer forming the first buffer layer, or inner buffer layer 63 may have a thickness of 0.003 to 0.030 inches dependent upon the type and size of termination used for the fiber-optic cable. In one particular embodiment, a thickness of 0.007 to 0.015 inches in combination with a second buffer layer of 0.0008 to 0.0015 inches might be used.

The second buffer layer, or outer buffer layer 64, is formed to overlay the first buffer layer and to act together with that first buffer layer 62 to form the buffer 60 for the fiber-optic cable. In accordance with one aspect of the invention, the second buffer layer is a continuous material layer positioned over the first buffer layer. The second buffer layer 64 may be a continuous, homogenous, high modulus material layer applied over layer 62. The continuous material layer 64 is formed to be generally free of seams that exist with tape buffer layers. The buffer layer 64 of the invention effectively provides a smoother and easier movement of the buffer 60 within the other layers 68, 70 of the fiber-optic cable 50, thus reducing the buffer insertion force of the cable and also reducing the overall insertion force necessary to mate any terminal connectors that terminate the inventive fiber-optic cable. In that way, the present invention is particularly applicable to uses that require high-density fiber-optic connectors. This overcomes problems with earlier cable designs, where the buffer insertion force is too high for practical manual manipulation and connector applications using high density connector systems.

Furthermore, the unique continuous buffer layer and the construction of the inventive fiber-optic cable eliminates tape delamination that can occur in cables utilizing a wrapped buffer layer construction. The inventive fiber-optic cable also reduces the fiber bend/kink radius of the cable, thus giving it a more durable and robust construction, particularly in applications with limited space, such as aerospace applications. Such advantages, and other advantages provided by the present invention are discussed further herein below.

The second buffer layer is formed of a material that has a high flexural modulus. A polyimide material is one possible material for layer 64. The layer is applied in a continuous application process to generally provide a continuous material layer, with effectively no seams, as noted. The continuous application process may include, for example, a coating process, or an extrusion process. Suitable coating processes include powder coating, dip coating, and dispersion coating. Extrusion processes, such as conventional single screw extrusion, or melt pump extrusion, might also be used. Dispersion coating is one particularly applicable technique for the invention, and typically involves using a vertical multi-pass festooned transport system, with a pass through a container holding a liquid coating. U.S. Pat. No. 4,161,564, illustrates such a process. After the coating step, the cable is wiped through dies or sponges, followed by heat application after each pass to remove the solvent carrier base of the liquid coating. The heat applied will be determined by the boiling point and flash point of the solvent carrier. Typically, heat in the range of 280°-400° F. might be utilized. The number of passes through the dipping and heating cycle for the dispersion coating process is determined by the ultimate wall thickness that is desired for layer 64. Generally, each pass might deposit between 0.00001 and 0.0005 inches, depending upon the wiping configuration.

In accordance with another aspect of the invention, the surface of the first buffer layer 62 might be treated or pre-treated in order to achieve a desired bonding between the continuous second buffer layer 64, and the first buffer layer 62. Such a bonding is desirable so that the fiber-optic cable may be more easily stripped of its buffer 60 and associated buffer layers, as necessary for terminating the cable. Alternately, in other applications, it may not be desirable to adhere the second buffer layer 64 with the first buffer layer 62. As such, there would be no treatment or pre-treatment of the surface of the first buffer layer 62. In one embodiment, the first buffer layer might be surface etched utilizing a dip coating process with an etching material, followed by drying of the solvent carriers in a vertical oven. For example, one etching material might be FluoroEtch from Acton Technologies of Pittston, Pa.

Another layer treatment process utilizes thin surface coatings that are applied utilizing a dip in various lacquers or dispersed materials, followed by drying of the solvent carriers in a vertical oven. The thin surface coatings might involve polyamides, polyamide/imides, acrylates, silicones, or chemically-modified fluoropolymer dispersions.

Still another surface treatment process involves an in-line plasma treatment, wherein a high voltage corona is utilized to etch the first buffer layer. One possible plasma treatment system utilizes Tri-Star in-line plasma treatment equipment available from Tri-Star Technologies of El Segundo, Calif.

The material for forming the second buffer layer is a high flexural modulus material. The flexural modulus refers to parameters measured by the ASTM-D790 titled "Standard Test Method for Flexural Properties of Unreinforced and Reinforced Plastics and Electrical Insulating Materials". A material having a flexural modulus in the range of 1.0-10.0 GPa might be utilized. More preferably, a material having a flexural modulus of 1.5-5.0 GPa is utilized. Furthermore, the material of the invention has low smoke emission and low toxicity. For example, a smoke value of <100 in four minutes is preferred when tested in accordance with Boeing Commercial Airline Company's BSS-7324 and BSS-7328 specification support standards in a NIST smoke chamber. Even more preferable is a value of less than 50 in four minutes. A similar test method and apparatus can be found in ASTM E-662, however, the test samples should be mounted on a comb fixture and the test for smoke obscuration levels should be limited to four minutes instead of the 20 minutes described in this test standard. The material of the invention should have a low emission of the gases CO, HCN, HCl, $SO_2$, NOx, and HF, when tested in accordance with Boeing Specification Standard BSS-7329, which is a twenty-minute test. Additionally, the fiber-optic cable should meet the flammability requirements of FAR 25. Finally, the material has a high temperature rating in the range of 125° C.-350° C. More preferably, a temperature range in 150° C.-300° C. is desired.

In one embodiment of the invention, a polyimide material is utilized to provide the homogenous and continuous material layer that forms a second buffer layer 64 over the first buffer layer 62. In one particular embodiment, the polyimide is Pyre ML RC-5097 Wire Enamel that is available from Industrial Summit Technology Corp. of Parlin, N.J.

While the polyimide layer is desired for one embodiment of the invention, other material layers having high flexural modulus and the desired attributes noted above might be utilized. For example, suitable materials might include the following: Polyphenylene sulphide or sulfone (PPS, PPSO, PAS); Polyphenylene oxide (PPO); Polyetherketones (PEEK, PEK, PEKE); Liquid crystal polymers (LCP); (PBO) Polybenzoxazole; (PIBO) Polyimidobenzoxazoles; Polycarbonates; Polyesters (PET); Polyamides; Polyamideimides.

The second buffer layer is applied in a continuous application process as noted above, such as a coating process or an extrusion process. It is desirable that the coating is applied in a smooth and continuous fashion to provide the seamless and continuous layer 64 and the benefits of the fiber-optic cable 50, as noted herein. The second buffer layer will have a thickness in the range of 0.0005 inches to 0.0050 inches. Or, more specifically, the second buffer layer may have a thickness in the range of 0.0007 inches-0.0030 inches. Still further, the second buffer layer may have a thickness in the range of 0.008 inches-0.0015 inches. The heat processing settings for the second buffer layer is in the range of 280° F.-400° F. The second buffer layer is generally seamless do to the continuous material layer applied, but it does not have to be completely seamless, only predominantly seamless as opposed to the buffer layers of prior art, such as those formed utilizing wound tape material.

In accordance with another aspect of the present invention, the fiber-optic cable 50 utilizes a slip layer 66, or lubrication layer, that further reduces the buffer insertion force for the cable 50. Specifically the slip layer 66 is positioned around the buffer. The slip layer 66 is formed of a low surface-friction film. In one embodiment of the invention, the slip layer is formed of a material that includes a fluoropolymer or a polyimide. In one particular embodiment, the slip layer 66 is formed of a PTFE tape material, such as a PTFE tape available from Plastomer Technology of Newtown, Pa. The tape is applied along the length of the buffer 60 to cover the buffer.

In accordance with one aspect of the present invention, slip layer 66 is formed around buffer 60, utilizing a longitudinal overlap, or cigarette-style overlap along the length of fiber-optic cable 50. That is, the tape is longitudinally overlapped around buffer 60, rather than being helically wrapped, as in some cable constructions. A suitable tape width for the invention might be 0.125 inches, with an overlap percentage of approximately 20% to 40%, for example. The construction of slip layer 66 further eliminates multiple seams in the slip layer that are positioned at angles to the sliding, or telescoping movement of the buffer and fiber in the outer layers of the cable, as would be present with a tape layer that is helically wrapped. The slip layer 66 is longitudinally pulled along the length of the fiber-optic cable, under a strength member 68, to be positioned between the buffer 60 and the outer layers 68, 70. In one embodiment, the slip layer is formed of a skived PTFE tape material, approximately 0.001 inches in thickness. However, other tape dimension might be utilized. For example, a material having a thickness in the range of 0.0005 inches to 0.002 inches by a width in the range of 0.100 inches to 0.250 inches might be utilized. Or, more specifically, a material having a thickness in the range of 0.0005 inches to 0.001 inches by a width dimension of 0.110 inches to 0.150 inches might be utilized.

While a skived PTFE tape layer is one desired material for the slip layer 66, other materials, such as from the group of FEP, PFA, MFA, PTFE, and other suitable fluoropolymers, as fabricated into narrow and thin films, might be utilized. In addition to Plastomer Technology, other material layers might be supplied by DeWal of Saunderstown, R.I., and St. Gobain Performance Plastics of Hoosick Falls, N.Y.

Referring again to FIGS. 2 and 3, fiber-optic cable 50 incorporates outer layers for further protection of the optical fibers. Specifically, the cable 50 includes a strength member, or strength layer 68, that surrounds the buffer 60 and fiber 52, and an outer jacket 70 that surrounds the strength member 68. As noted above, when fiber-optic cable 50 is terminated in a suitable connector and then is mated with another connector, part of the engagement force realized at the connector involves movement of the fiber 52 and buffer 60, within the strength member 68 and outer jacket 70, or the buffer insertion force.

The strength member is formed of woven fibers that include both Aramid fibers mixed with glass fibers. For example, Aramid fibers include Kevlar, available from DuPont, and Twaron from Akzo of Zuchwil, Germany. Suitable glass fibers, or fiberglass material, are available from Conneault Industries of West Greenwich, R.I., and American & EFIRD, Inc. of Mt. Holly, N.C. To form the strength member, from 2 to 14 Aramid fibers are woven along with from 2 to 14 glass components for a combined total of 16-fiber in the woven braid. A woven construction with all aramid fibers is possible with some degradation in the smoke emission levels. In one particular embodiment of the invention, 4 Aramid fibers and 12 glass fibers are woven in a 16-fiber woven braid, according to known techniques. A suitable weave angle might be 8-9 picks per inch. Braiding equipment, such as braiders from Wardwell of Central Falls, R.I.; Hacoba of Wuppertal, Germany, or Steeger of Inman, S.C.; Niehoff Endex North America Inc. of Swedesboro, N.J. might be utilized. The strength member may have a thickness, for example, in the range of 0.0020 inches to 0.0325 inches.

Outer jacket 70 is formed of a material that has low smoke, flame and toxicity characteristics suitable for the temperature requirements of the cable, as noted above, with respect to the smoke and toxicity requirements of the second buffer layer. A fluoropolymer material, such as PFA, might be utilized to form jacket 70. Conventional thermoplastic extrusion processes, such as those noted above with respect to the first buffer layer might be utilized to apply the outer jacket. Furthermore, coating processes, such as those noted above with respect to the second buffer layer might also be utilized for forming the outer jacket 70. In addition to extrusion and coating, wrapped tapes might be utilized to form the outer jacket. The wrapped tapes, such as polyimide and PTFE tapes might be wrapped and then sintered, according to appropriate jacketing specifications. In one particular embodiment of the invention, the outer jacket is formed of a single layer of extruded PFA material, such as PFA available under the trademark Neoflon™ from Daikin America, Inc. of Orangeburg, N.Y. or the registered trademark Teflon® PFA from DuPont. The heat processing temperatures for extrusion are available in both Daikin and DuPont literature for this material. Other potential jacket materials include FEP, MFA, PEEK, PBDF, ETFE, polyurethane, polypropylene, and polyolefin. The outer jacket may have a thickness, for example, in the range of 0.005 inches to 0.020 inches.

One suitable cable of the invention, for example, utilizes a glass fiber, with cladding and coating, which has a nominal O.D. of 245 μm or 0.0096 inches. The buffer over the fiber includes the first buffer layer of expanded PTFE having a thickness of approximately 0.0249 inches to yield an O.D. of around 0.0345 inches, and the second buffer layer of a polyimide material that is coated as a continuous layer onto the expanded PTFE, and has the thickness of approximately 0.0005 inches to yield an O.D. around 0.0350 inches. The skived PTFE tape layer is positioned around the buffer, and has the thickness of approximately 0.0005 inches to yield an O.D. around 0.0355 inches. Next, a braid of approximately 0.0225 inches surrounds the cable (O.D. 0.0580 inches), followed by a jacket of approximately 0.015 inches. Such a constructed cable would yield an O.D. of approximately 0.073 inches. The exemplary cable provides all the benefits of the invention; however, the invention is not limited to such an example. It will be understood by a person of ordinary skill in art that various different thicknesses within the noted ranges might be utilized for the successive layers of the inventive cable, without deviating from the invention.

Figure 4:
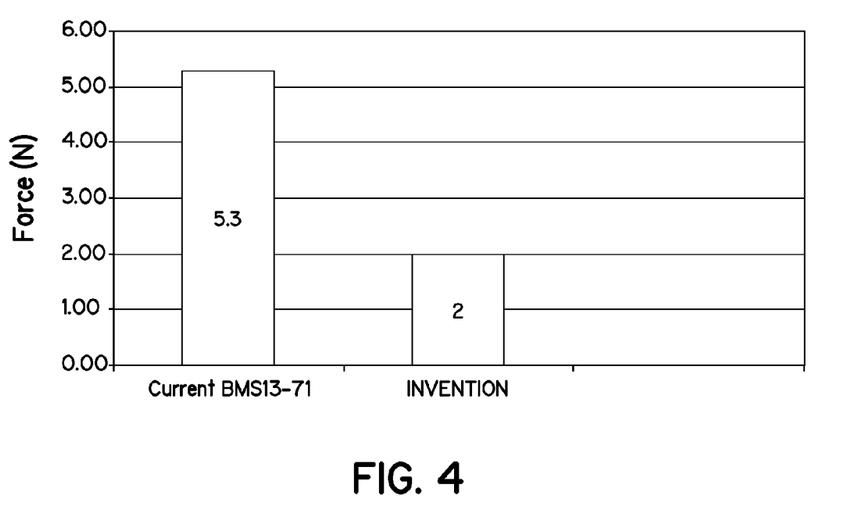
FIG. 4 is a bar graph illustrating improvements in buffer insertion force realized by an embodiment of the present invention.

The fiber-optic cable of the present invention provides significant advantages over existing fiber-optic cables. First, as noted above, the present invention significantly reduces the buffer insertion forces associated with the cable. For example, referring to FIG. 4, a bar graph is shown of the buffer insertion force test between a current fiber-optic cable available from Tensolite, the assignee of the present invention, under the name BMS-13-17, and the inventive cable disclosed herein. As is shown, a buffer insertion force of 5.3 Newtons is reduced utilizing the inventive fiber-optic cable to a buffer insertion force of approximately 2 Newtons. This is a 62% reduction in the buffer insertion force realized by the construction of fiber-optic cable 50. This allows higher density connectors to be utilized and mated, than is currently possible utilizing existing fiber-optic cable technology.

Figure 5:
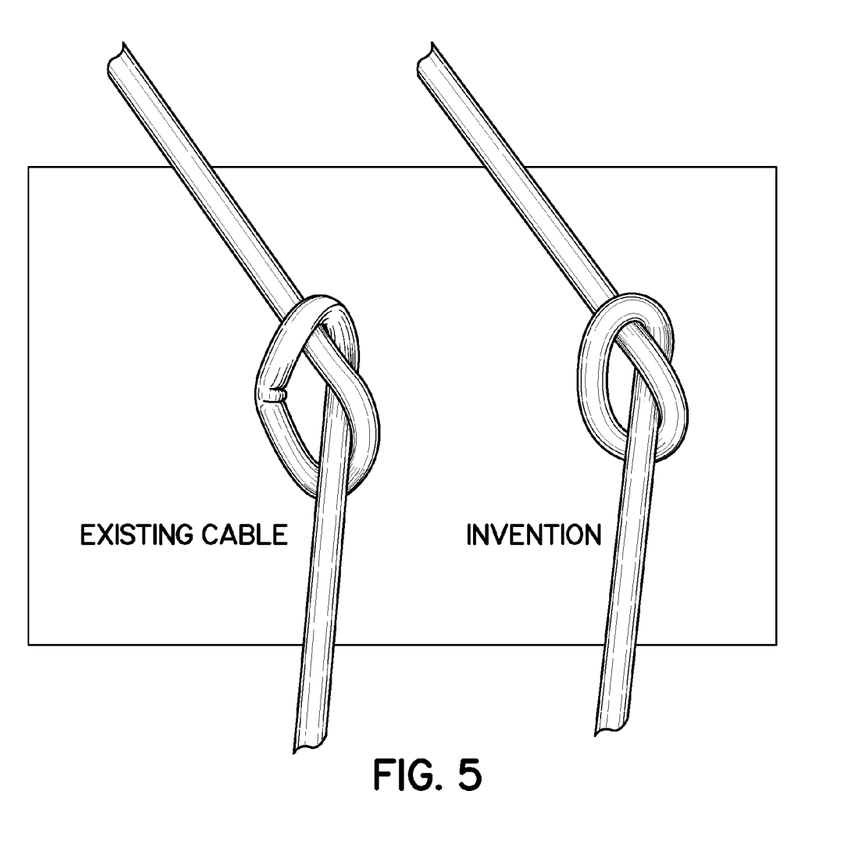
FIG. 5 is a graphical illustration of improvements in kink and bend resistance in accordance with aspects of the present invention.
Figure 6:
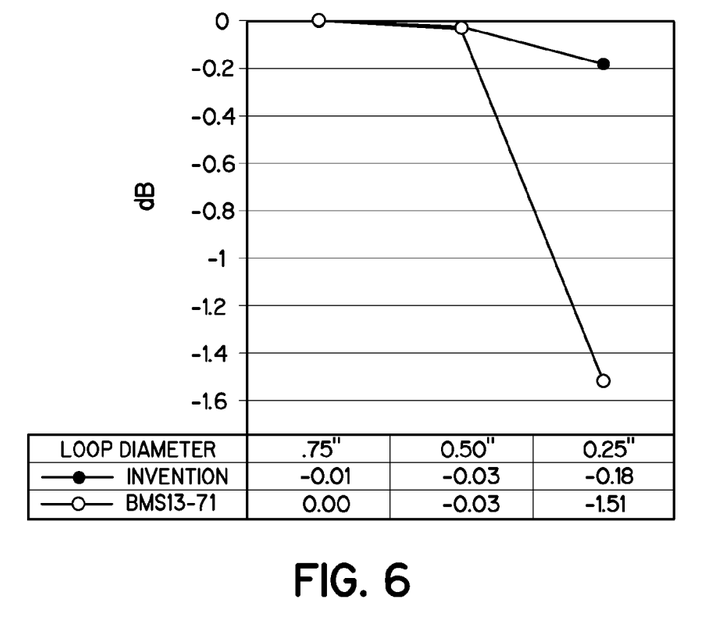
FIG. 6 is a graphical illustration of improvements in the kink and bend resistance of the invention cable versus another cable design.
Figure 7:
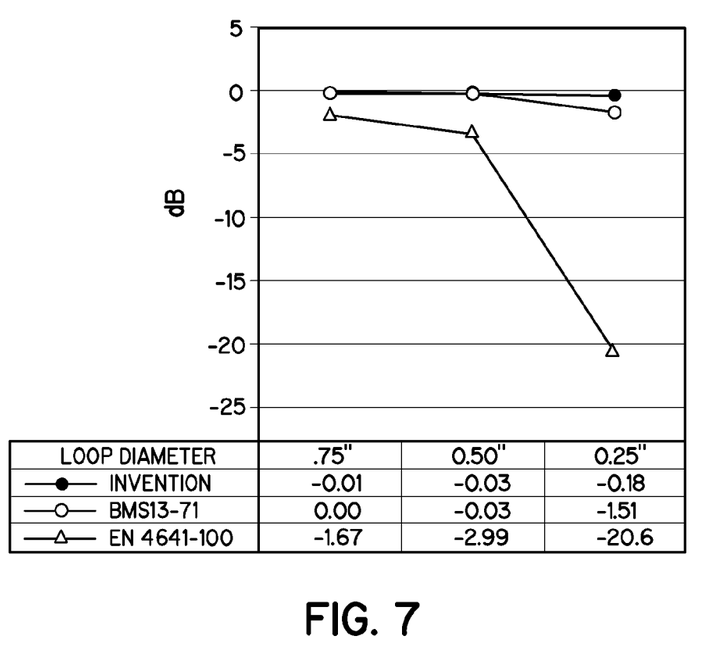
FIG. 7 is another graphical illustration of improvements in kink and bend resistance of the invention cable versus the other cable designs.

The present invention also reduces the bending/kink radius of the optical fiber and buffer components. As may be appreciated, because fiber-optic cables transmit light down a glass fiber, bending and kinking is a significant issue in the use of such cable. Specifically, a fiber-optic cable that is physically manipulated and bent or kinked must still be able to transmit the signal at a suitable optical power, even when a specified bend/kink radius has been exceeded. The present invention provides a significant improvement over the art in kink resistance. In fact, fiber-optic cable 50 presents an eight-fold improvement in the kink resistance of the cable. FIG. 5 illustrates knotted buffer and fiber components, showing both the new cable of the present invention and the existing BMS13-71 cable available from Tensolite. FIG. 6 illustrates graphically the improvement. The cable kink resistance illustrated in FIG. 6 shows the cable's ability to withstand kinking by indicating the optical power measured upon a particular size loop formed in the cable. In FIG. 6, the inventive cable is indicated as INVENTION and shows a significant improvement at a tighter loop diameter. FIG. 7 illustrates improvements of the cable constructed in accordance with the present invention versus a tight buffer cable, such as described in the European Standard EN 4641-100 available from Nexans of Paris, France. Generally, tight buffer cables have poor bend/kink radius parameters, and poor thermal shock and cycling performance.

Figure 8:
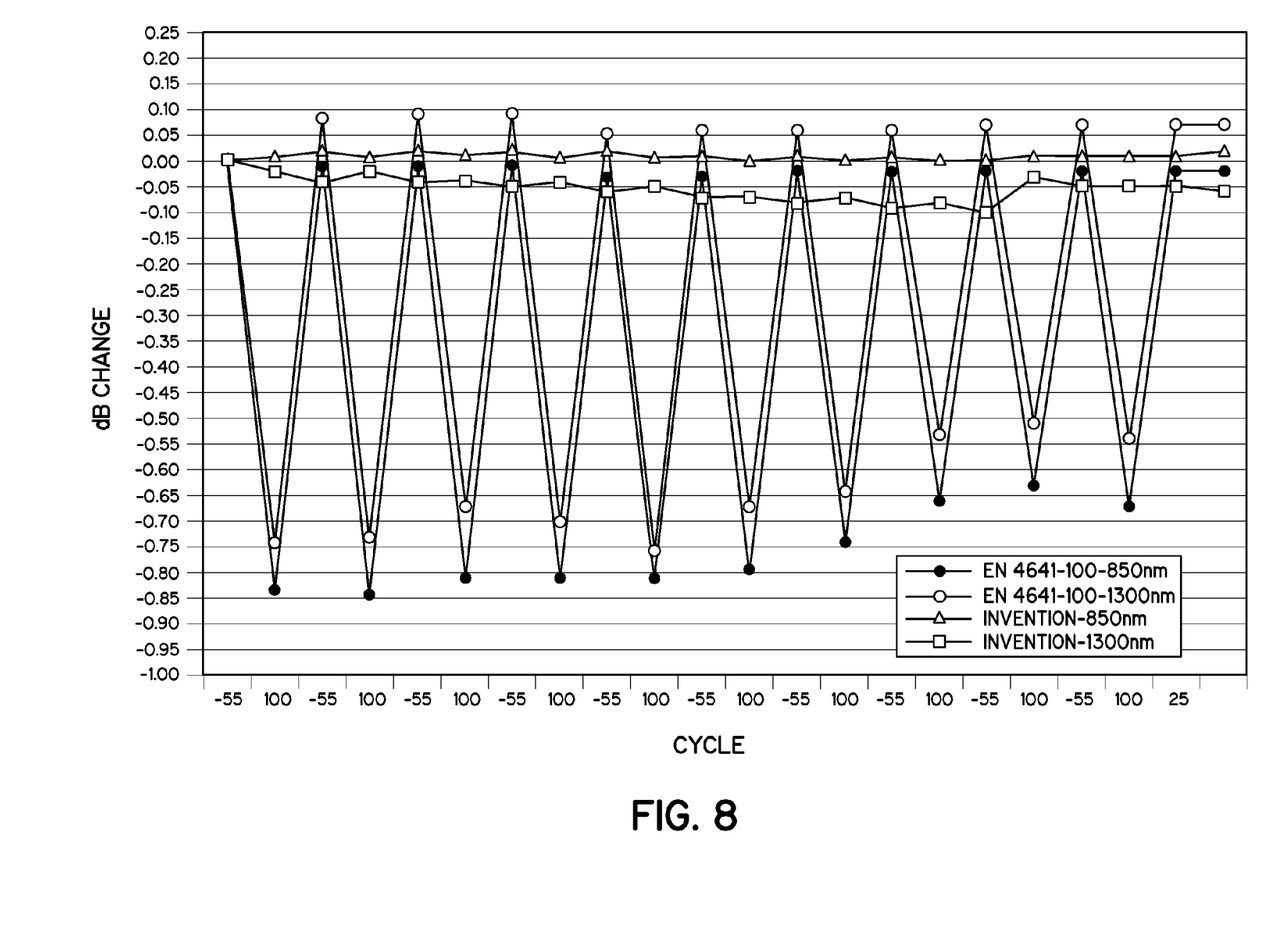
FIG. 8 is a graphical illustration of improvements in thermal shock resistance of the inventive cable versus other cable designs.

FIG. 7 illustrates a significant advantage of the present semi-loose structure cable in kink resistance versus the tight buffer cable. The present invention provides a 115 times improvement in kink resistance over the tight buffer cable The present invention also provides a significant improvement in its thermal shock characteristics. The thermal shock test exposes a cable to maximum operating temperature extremes (high and low temperatures), and measures the change, or variation, in the optical power due to the thermal cycling. Referring to FIG. 8, and eight-fold increase in performance of the inventive cable, noted above, versus an existing tight buffer cable, such as the EN 4641-100 cable, is shown. The EN 4641-100 cable is shown in FIG. 8 to experience an optical power change of approximately 0.85 db versus a 0.10 db change in the invention during −55° C. temperature exposure cycles.

The cable of the present invention, with its improved kink resistance, also provides significant advantages in fiber-optic cable applications, within otherwise protected environments. In certain environments, such as the electronic environment in an avionics box, outer strength members and jackets might not be necessary for physical protection of the cable. To that end, an alternative embodiment of the invention provides the significant improvements in kink resistance of the invention, while maintaining the low smoke emission and low toxicity of a cable, as is desired for aerospace applications.

Figure 9:
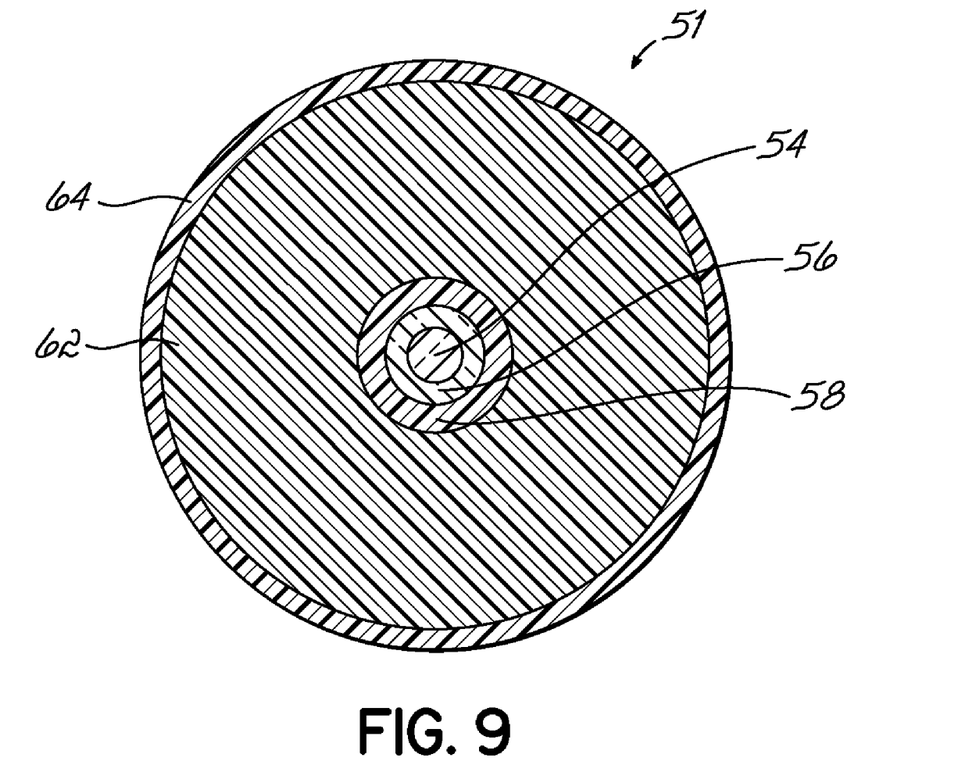
FIG. 9 is a cross-section view of another embodiment of the invention.

FIG. 9 illustrates an alternative embodiment of the invention that provides a desired kink resistance, and is suitable for use in various protected environments, such as avionics boxes. FIG. 9 illustrates a cable similar to the embodiment illustrated in FIGS. 2 and 3. Where suitable, like reference numerals are utilized. Cable 51 includes a fiber element, with a core 54 and a suitable cladding 56. The coating 58 surrounds the glass fiber, and its elements. A multiple layer buffer includes the first buffer layer 62, and the second buffer layer 64 formed of a continuous material layer constructed in accordance with the invention, as noted herein. Cable 51 does not incorporate a slip layer, or an outer strength member and jacket, as it will be utilized in protected environments, where such strength members and jackets may be unnecessary. Cable 51, in accordance with aspects of the invention, provides a significant improvement in kink resistance, as noted herein, and also provides the necessary low smoke and low toxicity features desirable in aerospace applications.

The eight-fold reduction in both the fiber bend/kink radius performance and thermal shock transmittance realized in the invention were unexpected in regard to prior art cables. As such, the improvements to fiber-optic cables, in accordance with aspects of the invention extends beyond improvements in buffer insertion force.

The present invention also provides additional improvements. The inventive cable has a lower weight (<4.60 kg/km versus 4.64 kg/km) and O.D. (1.80 mm versus 1.89 mm) than existing BMS13-71 cables. As may be appreciated, in aerospace applications, space and weight are at a premium, within the design parameters of a system, and thus, improvements in size and weight realized by the present invention make the cable particularly useful for such aerospace applications. Furthermore, the lower diameter becomes very important in order for the cable to be utilized with a variety of military and commercial connectors.

An additional improvement provided by the present invention is the elimination of tape delamination that can occur due to instabilities in thermal processing when manufacturing previous fiber-optic cables that utilized wrapped tape as part of the buffer.

What is claimed is:

1. A fiber-optic cable comprising:
at least one optical fiber, the optical fiber including a core and a cladding around the core;
a primary buffer around the optical fiber;
a multi-layer secondary buffer positioned around the optical fiber and primary buffer, the secondary buffer including at least a first buffer layer formed of PTFE and a second buffer layer overlaying the first buffer layer;
an outer surface of the PTFE of the first buffer layer being pre-treated to modify the outer surface for receiving application of the second buffer layer;
the second buffer layer being an homogenous and continuous material layer applied over the pretreated outer surface of the first buffer layer in a continuous application process including at least one of a coating or an extrusion process;

the second buffer layer having a thickness in the range of 0.0005 to 0.0050 inches;

a strength member layer positioned around the primary and secondary buffers;

an outer jacket positioned around the strength member.

2. The fiber-optic cable of claim 1, wherein the first buffer layer includes an expanded PTFE layer having a density in the range of 0.3 to 1.9 gms/cc.

3. The fiber-optic cable of claim 1 wherein the second buffer layer is formed of a material including at least one material selected from the group of polyphenylene sulphide, polyphenylene sulfone, polyphenylene oxide, polyetherketones, liquid crystal polymers, polycarbonates, polyesters, polyamides, and polyimides.

4. The fiber-optic cable of claim 1, wherein the first buffer layer includes expanded PTFE.

5. The fiber-optic cable of claim 1, wherein the second buffer layer includes a high flexural modulus material having a flexural modulus in the range of 1.0 to 10.0 GPa.

6. The fiber-optic cable of claim 1 wherein the continuous application process is a coating process including at least one of the following: powder coating, dip coating and dispersion coating.

7. The fiber-optic cable of claim 1 wherein the continuous application process is an extrusion process including at least one of the following: screw extrusion and melt pump extrusion.

8. The fiber-optic cable of claim 1 wherein the second buffer layer is formed of a polyimide material.

9. The fiber-optic cable of claim 1 wherein the outer surface of the first buffer layer is pre-treated by at least one of surface etching, applying thin surface coatings and drying the coatings, and plasma treating to modify the outer surface of the first buffer layer.

10. A method for forming a fiber-optic cable comprising:
presenting an optical fiber having a core and a cladding around the core;
a primary buffer being positioned around the optical fiber;
positioning a multi-layer secondary buffer around at least one optical fiber by:
forming a first buffer layer of PTFE on the primary buffer around the optical fiber;
pre-treating an outer surface of the PTFE of the first buffer layer to modify the outer surface for receiving application of a second buffer layer;
forming a continuous second buffer layer from an homogenous material by applying the second buffer layer over the pretreated outer surface of the first buffer layer in a continuous application process including at least one of a coating process or an extrusion process;
forming the second buffer layer to have a thickness in the range of 0.0005 to 0.0050 inches;
positioning a strength member layer around the primary and secondary buffers; and
positioning an outer jacket around the strength member.

11. The method of claim 10 further comprising forming the second buffer layer with a continuous layer of a polyimide material.

12. The method of claim 10 wherein the outer surface of the first buffer layer is pre-treated by at least one of surface etching, applying thin surface coatings and drying the coatings, and plasma treating to modify the outer surface of the first buffer layer.

13. The method of claim 10 further comprising forming the first buffer layer with a continuous layer of expanded PTFE.

14. The method of claim 13, wherein the first buffer layer includes an expanded PTFE layer having a density in the range of 0.3 to 1.9 gms/cc.

15. The method of claim 10 wherein the material for the second buffer layer includes a high flexural modulus material having a flexural modulus in the range of 1.0 to 10.0 GPa.

16. The method of claim 10 wherein the continuous application process is a coating process including at least one of the following: powder coating, dip coating and dispersion coating.

17. The method of claim 10 wherein the continuous application process is an extrusion process including at least one of the following: screw extrusion and melt pump extrusion.

18. The method of claim 10 further comprising forming the second buffer layer with a continuous layer formed of a material including at least one material selected from the group of polyphenylene sulphide, polyphenylene sulfone, polyphenylene oxide, polyetherketones, liquid crystal polymers, polycarbonates, polyesters, polyamides, and polyimides.

19. A fiber-optic cable comprising:
at least one optical fiber, the optical fiber including a core and a cladding around the core;
a primary buffer around the optical fiber;
a multi-layer secondary buffer positioned around the optical fiber and primary buffer and including at least a first buffer layer formed of PTFE and a second buffer layer overlaying the first buffer layer;
an outer surface of the PTFE of the first buffer layer being pre-treated to modify the outer surface for receiving application of the second buffer layer;
the second buffer layer being a continuous material layer applied over the pretreated outer surface of the first buffer layer using a continuous application process including at least one of a coating or an extrusion process;
the second buffer layer having a thickness in the range of 0.0005 to 0.0050 inches.

20. The fiber-optic cable of claim 19, wherein the first buffer layer includes an expanded PTFE layer having a density in the range of 0.3 to 1.9 gms/cc.

21. The fiber-optic cable of claim 19, wherein the second buffer layer includes a high flexural modulus material having a flexural modulus in the range of 1.0 to 10.0 GPa.

22. The fiber-optic cable of claim 19, wherein the second buffer layer is formed of a polyimide material.

23. The fiber-optic cable of claim 19 wherein the second buffer layer is formed of a material including at least one material selected from the group of polyphenylene sulphide, polyphenylene sulfone, polyphenylene oxide, polyetherketones, liquid crystal polymers, polycarbonates, polyesters, polyamides, and polyimides.

24. The fiber-optic cable of claim 19 wherein the outer surface of the first buffer layer is pre-treated by at least one of surface etching, applying thin surface coatings and drying the coatings, and plasma treating to modify the outer surface of the first buffer layer.

25. The fiber-optic cable of claim 19 wherein the continuous application process is a coating process including at least one of the following: powder coating, dip coating and dispersion coating.

26. The fiber-optic cable of claim 19 wherein the continuous application process is an extrusion process including at least one of the following: screw extrusion and melt pump extrusion.

* * * * *